United States Patent
Walsh et al.

(10) Patent No.: US 6,438,710 B1
(45) Date of Patent: Aug. 20, 2002

(54) CIRCUIT AND METHOD FOR IMPROVING MEMORY INTEGRITY IN A MICROPROCESSOR BASED APPLICATION

(75) Inventors: James P. Walsh, Joliet; Steven T. Delong, Woodridge, both of IL (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 0 days.

(21) Appl. No.: 09/386,794

(22) Filed: Aug. 31, 1999

(51) Int. Cl.[7] .................................................. G06F 11/00
(52) U.S. Cl. ........................................... 714/23; 711/166
(58) Field of Search .............................. 714/23, 24, 25, 714/27, 30, 34, 39, 42, 43, 48; 711/111, 163, 166

(56) References Cited

U.S. PATENT DOCUMENTS

| | | | |
|---|---|---|---|
| 4,348,722 A | * 9/1982 | Gunter et al. | 364/200 |
| 4,965,717 A | * 10/1990 | Cutts, Jr. et al. | 364/200 |
| 5,127,004 A | 6/1992 | Lenihan et al. | 370/110.2 |
| 5,140,611 A | 8/1992 | Jones et al. | 375/7 |
| 5,268,903 A | 12/1993 | Jones et al. | 370/110.1 |
| 5,581,727 A | * 12/1996 | Collins et al. | 395/462 |
| 5,778,433 A | * 7/1998 | Collins et al. | 711/135 |
| 5,864,653 A | * 1/1999 | Tavallaei et al. | 315/181 |
| 5,929,897 A | * 7/1999 | Schneider et al. | 348/15 |
| 6,115,791 A | * 9/2000 | Collins et al. | 711/122 |
| 6,294,939 B1 | * 9/2001 | McClure | 327/172 |

OTHER PUBLICATIONS

Junichi Hiramatsu, Input/Output control device provided with memory protecting function, Nov. 29, 1984, JPAB, JP359210598A, 1–1.*

* cited by examiner

Primary Examiner—Nadeem Iqbal
(74) Attorney, Agent, or Firm—Welsh & Katz, Ltd.

(57) ABSTRACT

A microprocessor based system such as an automatic call distributor having a reset circuit to improve memory integrity of electronic memory is disclosed. The reset circuit includes a reset controller which receives an external reset signal that can be generated from a number of different sources. The external resent signal is synchronized with activity on a bus to produce an internal reset signal which is applied to the microprocessor to reset it after all pending requests for bus access are completed. The microprocessor is then reset, thus improving integrity of electronic memory.

30 Claims, 5 Drawing Sheets

CIRCUIT AND METHOD FOR IMPROVING MEMORY INTEGRITY IN A MICROPROCESSOR BASED APPLICATION

FIELD OF THE INVENTION

This invention relates generally to various microprocessor based applications and, more particularly, to a reset circuit for improving memory integrity suitable for use in an automatic call distributor.

BACKGROUND OF THE INVENTION

An automatic call distributor (ACD) is one example of a microprocessor based application. A typical ACD includes a central processing unit in conjunction with a main memory. The ACD functions to selectively interconnect telephonic calls received from external telephones of an external telephonic network with a number of internal telephonic units. An ACD may include a number of microprocessors which store data in electronic memory.

As will be apparent to one of ordinary skill in the relevant art, one requirement of such an ACD system is that data stored in memory must be maintained when the microprocessor is reset. Resets can occur in a number of different ways such as, for example, a deliberate reset which is caused by pressing a reset button, an automatic reset when the electronic circuitry itself senses a fault and needs to reset itself, or when a system administrator requests that the system reset itself.

When a reset signal is received, it is likely that the microprocessor is completing a write cycle to electronic memory such as, for example, Static Random Access Memory (SRAM) or Dynamic Random Access Memory (DRAM) memory. Thus, if the microprocessor is forced to reset without completing the write cycle to electronic memory, data in electronic memory may be corrupted. Thus, after the microprocessor is reset, the electronic memory may need to be verified and reloaded, which leads to increased time to bring the system to a functioning level.

Currently, a microprocessor of a system such as an ACD may be reset asynchronously, i.e. at any time that an external reset signal is sent to the microprocessor. If the microprocessor is currently executing a write to memory or has pending writes to memory, then these tasks are lost when the microprocessor is reset. For example, if the microprocessor is manually reset while memory is being written, then the write cycle in progress is aborted and the data is not written to memory. By asynchronously resetting the microprocessor, memory integrity is lost. Moreover, corrupt data in memory may cause undesirable behavior and/or system failure.

While the existing method of resetting a microprocessor of a system such as an ACD is relatively satisfactory, it causes memory to become corrupted in a number of different circumstances. As a consequence, system failure may occur or it may take a long time to validate or reload memory contents after a reset. Delays of this type cause significant economic harm to the operators of systems such as ACDs whose livelihood directly depends upon the rapid and proper routing of calls. Accordingly, a need exists for a better circuit and method for guaranteeing memory integrity in a microprocessor based system such as an ACD.

BRIEF SUMMARY OF THE INVENTION

In one embodiment, the present invention provides a circuit for improving memory integrity during reset. One embodiment of the circuit comprises, for example, a reset input to receive external reset signals, a bus monitor which monitors bus activity and generates a bus access signal when the bus is idle, and a reset generator responsive to the bus access signal to generate an internal reset signal in response to the external reset signal when the bus is idle.

In one specific embodiment of the invention, a reset controller comprises a reset signal generating means for generating the internal reset signal in response to the external reset signal being received and the bus access signal being received.

In another embodiment of the invention, the circuit further comprises a variable timer which generates an internal reset signal after waiting an interval of time which is appropriate for the recent bus activity. If a history of recent bus activity shows that many write cycles have taken place, then this allows, for example, an internal reset signal to be generated after waiting an interval of time appropriate for a write cycle to complete.

In another embodiment of the invention, the circuit further comprises a back-stop timer which automatically generates an internal reset signal after a predetermined interval of time even if the bus access signal indicates that the bus is busy. This allows, for example, a forced reset of the microprocessor when it has been in a bus cycle for a long time.

In one specific embodiment of the invention, the circuit is incorporated in a microprocessor based ACD wherein a reset controller is coupled to an input of the microprocessor to reset the microprocessor when an external reset signal is received by the reset controller. In this example, the external reset signal can be generated by a user of the ACD. Alternatively, for example, the external reset signal can be generated by other circuitry within the ACD.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DETAILED DESCRIPTION

Figure 1:
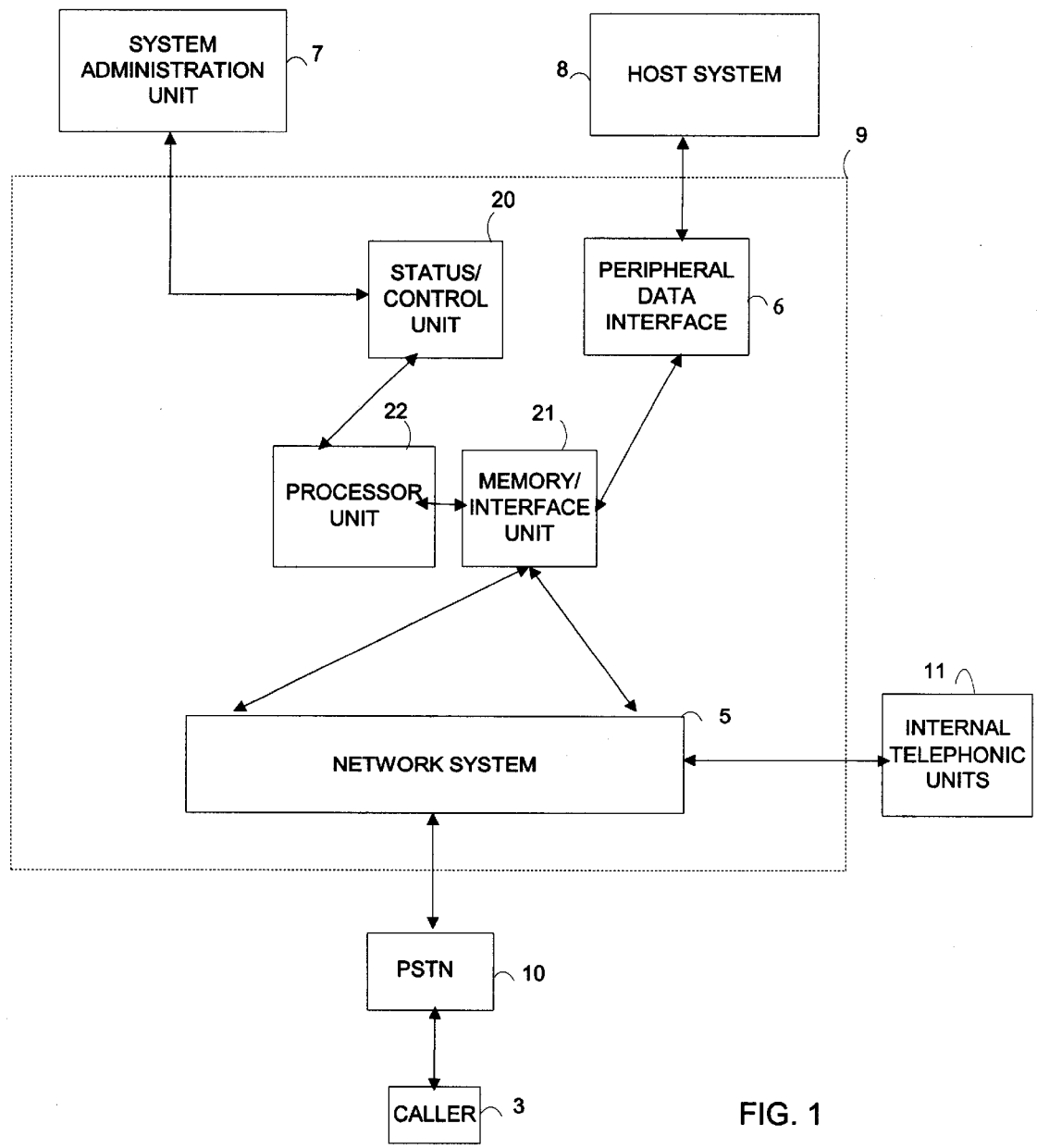
FIG. 1 is a simplified functional block diagram of an example of an automatic call distribution system.

Referring now to FIG. 1, the reset circuit of the present invention may be employed and incorporated into various microprocessor based applications, for example, the automatic call distribution (ACD) system 9 shown in FIG. 1. ACD functions to selectively and automatically interconnect a caller 3 calling through the public switched telephone network 10 to one of a number of internal telephonic units 11. For a more detailed discussion of automatic call distributors, reference may be made to U.S. Pat. No. 5,268,903 to Jones et al. entitled "Multichannel Telephonic Switching Network With Different Signaling Formats and Connect/PBX Treatment Selectable For Each Channel", issued Dec. 7, 1993; U.S. Pat. No. 5,140,611 to Jones et al. entitled "Pulse Modulated Self-Clocking and Self-Synchronizing Data Transmission and Method for a Telephonic Communication Switching System", issued Aug. 8, 1992 and U.S. Pat. No. 5,127,004 to Lenihan et al. entitled "Tone and Announcement Message Code Generator for a Telephonic Switching System and Method", issued Jun. 30, 1992. The contents of the above-referenced patents are incorporated by reference as if fully set forth herein.

As shown in FIG. 1, an ACD 9 may include a processing unit 22, memory/interface unit 21, status/control unit 20, system administration unit 7, peripheral data interface 6, host system 8, and network system 5. In an exemplary embodiment, the processing unit 22 is named a bus maintenance unit (BMU) and functions to control the ACD's switching, reporting, and maintenance operations. In an exemplary embodiment, the system administration unit 22 is a computer terminal, personal computer, or other computer system.

Figure 2:
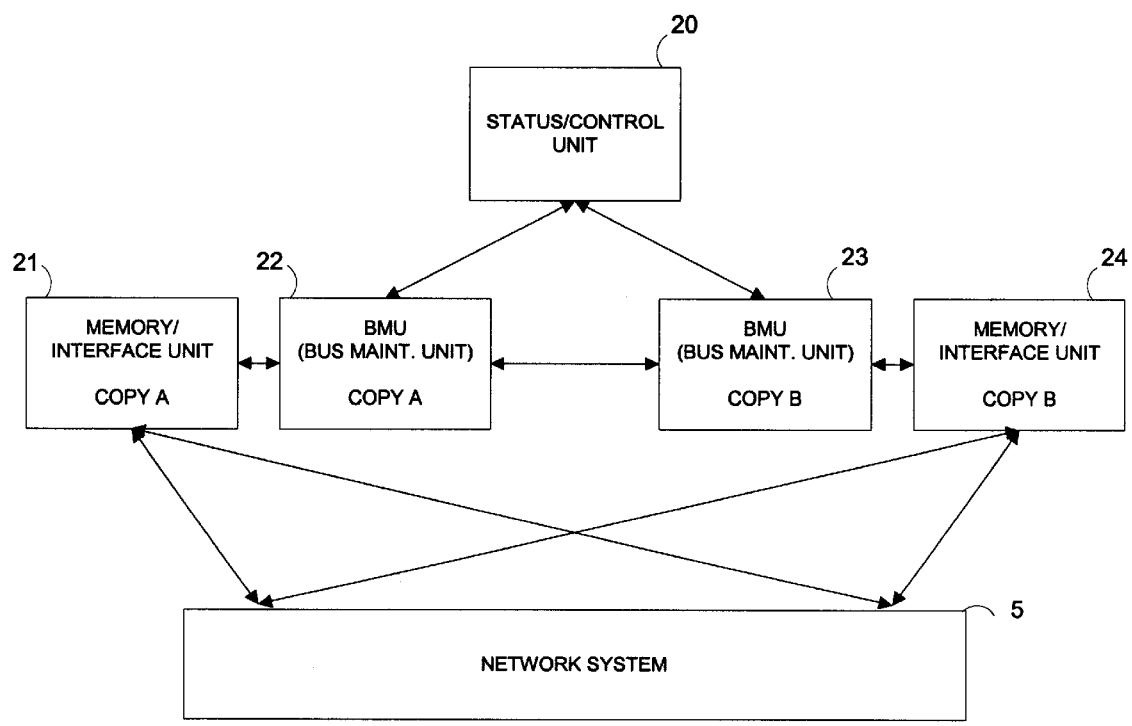
FIG. 2 is a simplified functional block diagram of a multiprocessor system in accordance with the ACD of FIG. 1.

Referring now to FIG. 2, illustrates one specific embodiment of an ACD 9 which includes two BMUs 22, 23, both of which interface to the status/control unit 20 and an associated memory/interface unit (respectively 21, 24). In this example, only one of the BMUs is "active" at any given time, while the other BMU is in "stand-by" mode. If the active BMU should fail or if a switch over is requested by service personnel, the stand-by BMU will become active and take over ACD operations. For example, if the system administrator notices that "active" BMU 22 is not functioning efficiently, then the administrator may initiate a switch to BMU 23 to insure that calls are routed properly and profitability is maximized.

Figure 3:
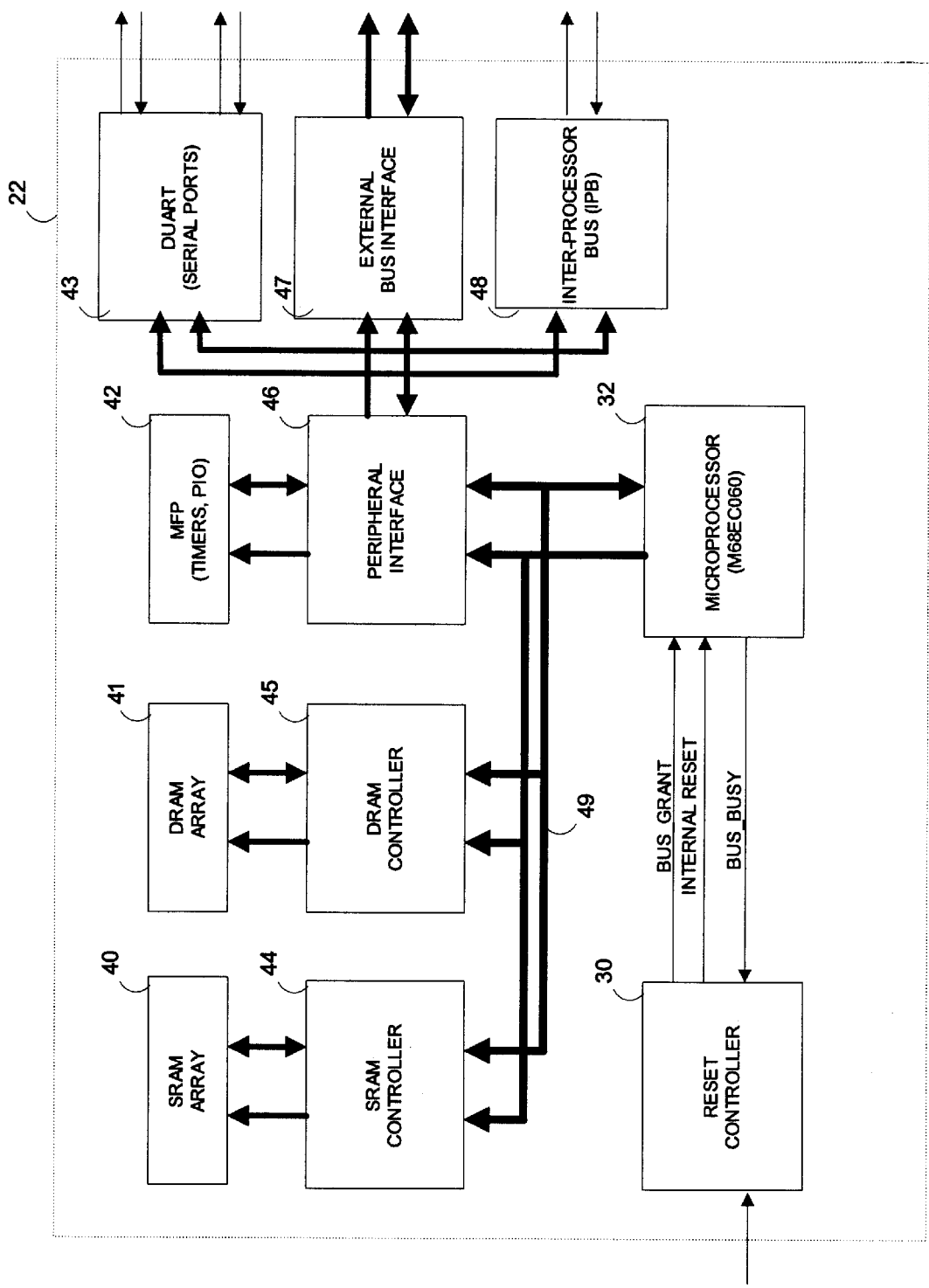
FIG. 3 is a simplified functional block diagram of a specific embodiment of the processor unit of the ACD of FIG. 1.

Referring now to FIG. 3, an exemplary illustration of components of BMU 22 are shown. In this example, BMU 22 includes a microprocessor 32, reset controller 30, SRAM 40, SRAM controller 44, DRAM 41, DRAM controller 45, multifunction peripheral 42, peripheral interface 46, dual universal asynchronous receiver-transmitter (DUART) 43, external bus interface 47, and interprocessor bus 48 that are interconnected as shown. The microprocessor 32 controls and manages the operations of the ACD 9. Further, the microprocessor 32 supervises the operation of bus 49. The bus 49 is a collection of signal wires which interconnects the electronic memory 40, 41 and microprocessor 32.

In an alternative embodiment, a bus monitor may supervise the operation of the bus 49 and provide access to the bus 49. A bus monitor may be directly connected to the bus 49 or may receive a signal from a separate microprocessor which functions to supervise the operation of the bus 49. A bus monitor may include a bus arbiter, a bus master, the reset controller 30, separate bus monitoring circuitry, and other known methods of determining bus activity.

In the example illustrated in FIG. 3, when the microprocessor 32 reads or writes data from electronic memory 40, 41, the information is transferred via the bus 49. Further, the microprocessor 32 interfaces with the reset controller 30. The reset controller 30 receives reset signals from external sources (i.e. external to the reset controller) which may be, for example, user generated by pressing a reset button on the BMU, a signal sent from an administrator sitting at the system administration unit 7, or from watchdog circuitry in the ACD 9. The external reset signal may be a reset signal generated in any manner including automatically generated reset signals internal to the microprocessor based system.

For example, if a user of the ACD notices that the BMU is not functioning properly, the user may press a push-button on the BMU 22 to send a signal to the reset controller 30.

In one embodiment of the present invention, as shown in FIG. 3, during normal operation of the BMU 22, a bus grant signal is asserted and the microprocessor 32 is granted the bus 49. Once an external reset signal (i.e. external to the reset controller 30) is received by the reset controller 30, the reset controller 30 responds by removing the bus grant signal which allows the microprocessor 32 to finish utilizing the bus 49. The external reset signal may comprise at least one of push button signals, a system administrator request, or a watchdog expiration signal. Then, the reset controller 30 monitors a bus busy signal from the microprocessor 32 to determine whether the bus is idle. The bus busy signal functions to notify the reset controller of when bus access is available. If the bus busy signal is "on" indicating that the bus 49 is busy, then the reset controller 30 holds off on sending an internal reset signal to the microprocessor 32. Thus, the "on" bus busy signal functions as a disable signal. Capturing the external reset signal in this manner allows the microprocessor to finish bus cycles before being reset. Thus, if the microprocessor 32 is performing a write to memory 40, 41, the write is completed before the reset controller 30 applies a reset to the microprocessor 32. If the bus busy signal is idle or becomes idle, then the reset controller 30 is enabled and automatically sends an internal reset signal to the microprocessor 32 thereby causing the microprocessor 32 to reset. The reset controller 30 thus functions as a gate which allows the output of an internal reset signal only when the bus busy signal indicates that any write cycle is complete or that the bus is idle.

In the above mentioned embodiment, the reset controller functions as a reset generator. The reset controller is a separate circuit (separate from the microprocessor) which generates an internal reset signal in response to the external reset signal when the bus 49 is idle. In an alternative embodiment, the reset generator may be internal to the microprocessor and may reset the microprocessor when the bus is idle. Further, a reset generator may include other known methods of generating an internal reset signal in response to an external reset signal and bus activity.

In another embodiment of the present invention, where the microprocessor based system consists of DRAM electronic memory, a memory refresher circuit which functions to insure that the DRAM is refreshed even while the microprocessor is being reset is further disclosed. For example, under an exemplary embodiment as in FIG. 3, the DRAM controller 45 sends refresh signals to the DRAM 41 even while the microprocessor 32 is being reset. This circuit insures that the DRAM cells do not decay and the data does not become corrupted during the time interval that the microprocessor is reset.

In an alternative embodiment, where the bus 49 may be shared by a number of microprocessors 32 or other devices, the reset controller 30 removes the bus grant signal from every device sharing the bus 49. In an alternative embodiment, where the bus 49 may be shared by a number of microprocessors 32 or other devices and where bus access is determined by a bus arbiter, the reset controller 30 removes the bus grant signal from the bus arbiter so that the bus arbiter does not grant the bus 49 to any device sharing the bus 49.

Figure 4:
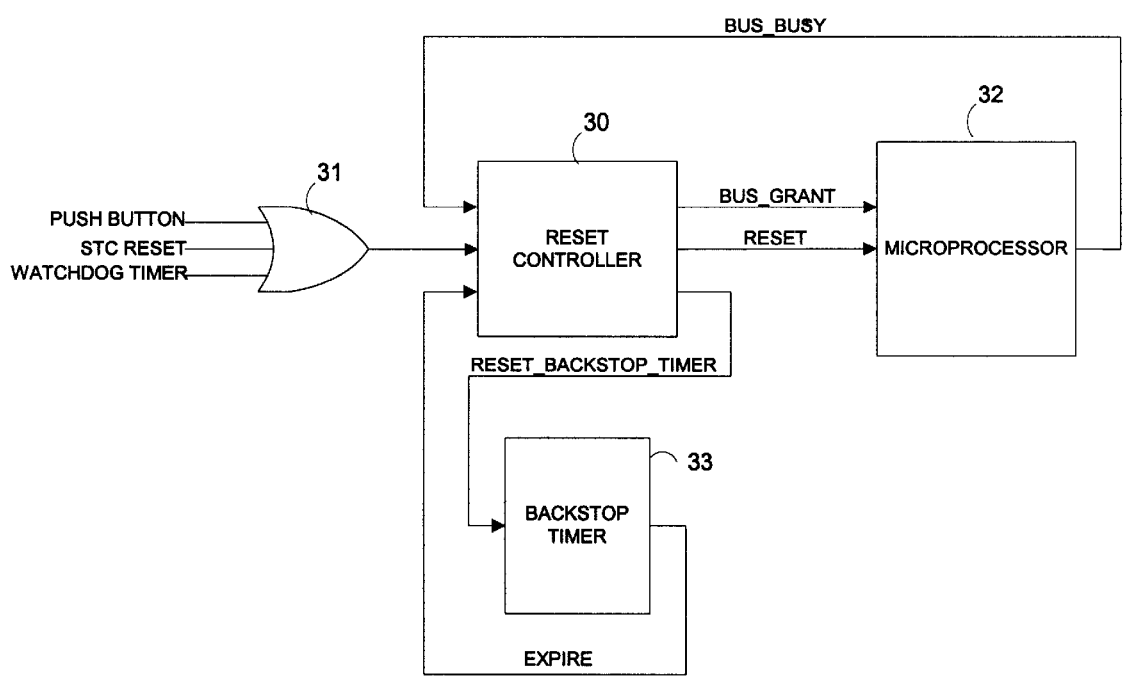
FIG. 4 is a simplified functional block diagram of an exemplary embodiment of a reset circuit.

Referring now to FIG. 4, under an exemplary alternative embodiment, the reset controller 30 is coupled with a backstop timer 33. The backstop timer 33 (which may be internal or external to the reset controller 30) functions with the reset controller 30 to insure that the microprocessor 32 is not in an invalid state, such as an unterminated bus cycle. For example, the microprocessor 32 while reading data from DRAM 41 or accessing DUART 43 may be waiting for a response from the peripheral and may not receive an answer. The backstop timer forces generation of an internal reset signal to the microprocessor 32 after a time period even though the bus 49 has not become idle.

In another exemplary embodiment, the reset circuit further comprises a variable timer which generates an internal reset signal after waiting an interval of time which is appropriate for the recent bus activity. The circuit may include means for storing a history of recent bus activity such as DRAM or SRAM. After accessing the history of bus activity, the variable timer 33 determines how long to wait and waits that length of time before sending an internal reset signal to the microprocessor 32. For example, if the bus 49 has recently been accessed for a number of write cycles, then the backstop timer 33 would wait an amount of time that is common for the recent bus write cycles before sending an internal reset signal to the microprocessor 32. By waiting an amount of time that allows for a recent write cycle to complete, it is likely that if the microprocessor 32 is accessing the bus for a write cycle then that write cycle will complete before the microprocessor 32 is forced to reset. If there is not a history of recent write cycles, then the microprocessor 32 is forced to reset after an amount of time which is typical for the recent bus activity. In an alternative embodiment, the microprocessor 32 or the reset controller 30 may keep a history of recent bus activity and force the microprocessor 32 to reset based upon the history of recent bus activity.

In an exemplary embodiment, the reset controller 30 is a field programmable gate array (FGPA) such as are well known in the art. The reset controller 30, however, may be implemented using any circuit or programmable device configured to performing the method of FIG. 5, including but not limited to programmable logic devices, such as a programmable read only memory, a programmable logic array, and a programmable array logic. In an exemplary embodiment, the backstop timer 33 is part of the FPGA that functions as the reset controller 30.

Figure 5:
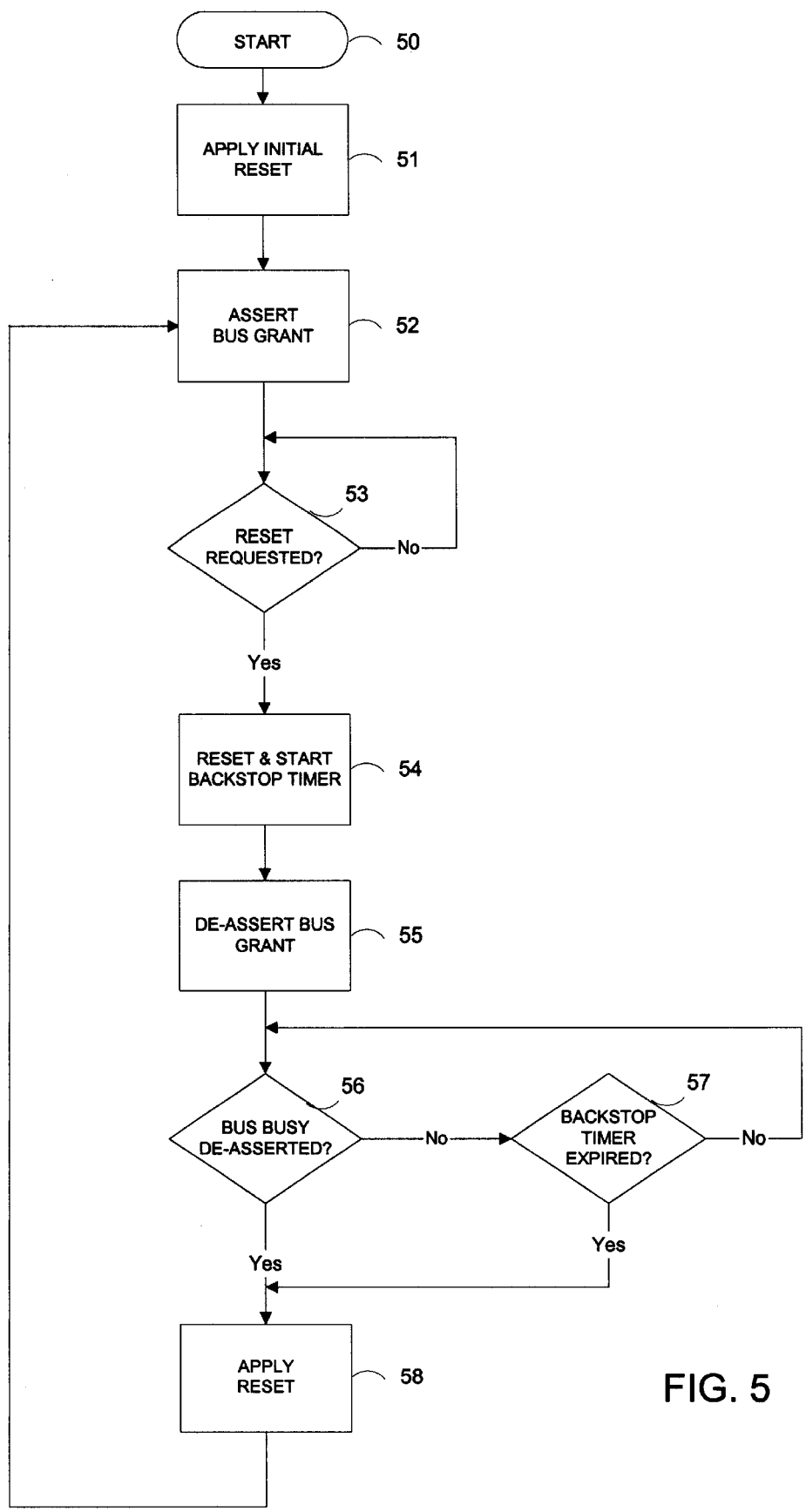
FIG. 5 is a simplified flow chart which illustrates an example of how the reset circuit shown in FIG. 4 operates to improve memory integrity.

Referring to FIG. 5, a simplified flow chart is shown which illustrates an example of how the reset circuit shown in FIG. 4 operates to improve memory integrity of a microprocessor based system such as an ACD. In this example, the reset circuit generally operates by generating an internal reset signal in response to receipt of an external reset signal, by querying activity of a microprocessor bus, and by resetting the microprocessor such that the microprocessor completes write cycles to electronic memory before the microprocessor is reset. In particular, from the start at block 50, an external reset signal is asserted and this external reset signal is synchronized with an internal clock to produce an internal reset signal. The internal reset signal is applied to the microprocessor 32 and other modules in the circuit to reset them.

During normal operation of the BMU 22, the reset controller 30 asserts the bus grant signal, see block 52, so that the microprocessor 32 has ownership of the bus 49. Then, if a reset is requested, see block 53, the bus grant signal is de-asserted, see block 55, and the reset controller monitors the bus busy signal, see block 56, to determine whether there is activity in bus 49. This step functions to capture the external reset signal while the reset controller 30 queries the microprocessor 32 to determine whether there is bus activity.

If the bus 49 is busy, it is likely that a write to electronic memory (either SRAM 40 or DRAM 41 in the illustrated embodiment) is in operation, and the bus busy signal is sent back to the reset controller 30. Once the bus 49 is determined to be inactive, i.e. bus busy de-asserted, then the microprocessor 32 can be safely reset, see block 58. Then, the internal reset signal is automatically applied to the microprocessor, see block 58, thus ending the sequence, see block 52.

In an exemplary alternative embodiment of the method, the reset circuit generates an internal reset signal after waiting an interval of time which is appropriate for recent bus activity. The method includes accessing a history of the recent bus activity and determining the interval of time which is appropriate for the recent bus activity. If the history of recent bus activity shows that many write cycles have taken place, then this allows, for example, an internal reset signal to be generated after waiting an interval of time appropriate for a write cycle to complete.

In an exemplary alternative embodiment of the method, the reset circuit also operates to generate a reset signal if the bus is not available after a predetermined interval of time. This step requires that a timer be started, see block 54, after a reset is received from an external source. Then, if the timer has expired, i.e. after a period of time has passed where the bus is still busy, then the microprocessor is reset immediately. In one embodiment, the time period may be automatically adjusted based upon recent bus activity. This step ensures that if the microprocessor is in an invalid state, then the reset occurs before a long period of time.

In another embodiment of the present method, where the microprocessor based system consists of DRAM electronic memory, an additional step which functions to insure that the DRAM is refreshed even while the microprocessor is being reset is further necessary. For example, during application of reset, see block 58, DRAM controller 45 may send refresh signals to the DRAM 41. This circuit insures that the DRAM cells do not decay and the data does not become corrupted during the time interval that the microprocessor is reset.

A specific embodiment of a circuit and method of improving memory integrity according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention, any and all modifications, variations, or equivalents that fall within the true spirit and scope of the basic underlying principles disclosed and claimed herein.

What is claimed is:

1. A circuit for improving memory integrity in a microprocessor based system having at least one bus, the circuit comprising:
   a reset input to receive external reset signals;
   a bus monitor which monitors bus activity and generates a bus access signal when the bus is idle; and
   a reset generator responsive to the bus access signal to generate an internal reset signal in response to the external reset signal when the bus is idle.

2. A circuit according to claim 1, wherein the microprocessor based system is an automatic call distributor.

3. A circuit according to claim 1, wherein the bus monitor comprises at least one of a microprocessor, a bus master, a bus arbiter, a reset controller, or separate bus monitoring circuitry.

4. A circuit according to claim 1, wherein the reset generator comprises at least one of a microprocessor, a reset controller, or separate reset generation circuitry.

5. A circuit according to claim 1, wherein the reset generator further comprises a variable timer which generates the internal reset signal in response to a history of recent bus activity.

6. The circuit of claim 5, wherein the history of bus activity is stored in electronic memory such as DRAM or SRAM, in the microprocessor, or a reset controller.

7. A circuit according to claim 5, wherein the variable timer waits a longer interval of time if there have been recent bus write cycles which have accessed the bus for a long interval of time.

8. A circuit according to claim 1, wherein the reset generator comprises at least one of a programmable gate array, a programmable read only memory, a programmable logic array, and a programmable array logic.

9. A circuit according to claim 1, wherein the external reset signal is at least one of a push button signal, a system administrator request, and a watchdog expiration signal.

10. A circuit according to claim 1, wherein the external reset signal is generated automatically by the microprocessor based system.

11. A circuit according to claim 1, wherein the reset generator comprises a back-stop timer which automatically generates an internal reset signal after a predetermined interval of time even if the bus access signal indicates that the bus is busy.

12. A circuit according to claim 1 further comprising a memory refresher which automatically sends signals to DRAM even during the time interval that the microprocessor is being reset.

13. A circuit corresponding to claim 1, wherein the reset generator is operatively electrically coupled to the microprocessor to wait until the bus is available to reset the microprocessor.

14. A circuit for improving memory integrity in a microprocessor based system, the circuit comprising:
    means for determining whether the microprocessor is accessing a bus;
    means for generating an internal reset signal in response to receipt of an external reset signal; and
    means for applying the internal reset signal to the microprocessor after the completion of any write cycle that was initiated but not yet completed prior to the receipt of the external reset signal such that the microprocessor is able to complete write cycles to electronic memory before the microprocessor is reset.

15. The circuit of claim 14 further comprising means for varying an interval of time before generating an internal reset signal.

16. The circuit of claim 14 further comprising means for determining an interval of time to wait by accessing a history of recent bus activity.

17. The circuit of claim 16, wherein the history of bus activity is stored in electronic memory such as DRAM or SRAM, in the microprocessor, or a reset controller.

18. The circuit of claim 16, wherein the interval of time is longer if there have been recent bus write cycles which have accessed the bus for a long interval of time.

19. The circuit of claim 14 further comprising means for determining the period of time in which a bus is busy and for generating the internal reset signal if the bus is not available after a predetermined interval of time.

20. The circuit of claim 14, wherein the internal reset signal is generated after write cycles to electronic memory are completed.

21. A circuit of claim 14 further comprising means for automatically generating an internal reset signal after a predetermined interval of time even if the bus is busy.

22. A circuit of claim 14 further comprising means for automatically refreshing DRAM memory even during the time interval that the microprocessor is being reset.

23. The circuit of claim 14 further comprising a user-operated switch for generating the external reset signal.

24. The circuit of claim 14, wherein the user-operated switch comprises a reset button.

25. A method for improving memory integrity in a microprocessor based system comprising:
    determining whether the microprocessor is accessing a bus and generating a bus access signal in response thereto;
    generating an internal reset signal in response to the bus access signal and an external reset signal such that the internal reset signal is generated after completion of any write cycle that was initiated but not completed prior to receipt of the external reset signal; and
    applying the internal reset signal to the microprocessor to cause the microprocessor to be reset in response thereto.

26. The method of claim 25 further comprising the steps of determining an interval of time in which a bus is busy and generating a reset signal if the bus is not available for the interval of time after the external reset signal is received.

27. The method of claim 26 further comprising the steps of accessing a history of recent bus activity and determining the interval of time based upon the history of recent bus activity.

28. The method of claim 25 further comprising the step of refreshing DRAM memory even during the time interval that the microprocessor is being reset.

29. The method of claim 25, wherein said internal reset signal is generated after write cycles to electronic memory are completed.

30. The method of claim 25, wherein the external reset signal is automatically generated internal to the microprocessor system.

* * * * *